No. 881,370. PATENTED MAR. 10, 1908.
W. L. BOYD.
INSECT EXTERMINATOR.
APPLICATION FILED JULY 8, 1907.

Witnesses
Inventor
William L. Boyd
By D. A. Gowrick
Attorney

THE NORRIS PETERS CO., WASHINGTON, D. C.

UNITED STATES PATENT OFFICE.

WILLIAM L. BOYD, OF LINCOLN, NEBRASKA.

INSECT-EXTERMINATOR.

No. 881,370.  Specification of Letters Patent.  Patented March 10, 1908.

Application filed July 8, 1907. Serial No. 382,763.

*To all whom it may concern:*

Be it known that I, WILLIAM L. BOYD, a citizen of the United States, residing at Lincoln, in the county of Lancaster and State of Nebraska, have invented certain new and useful Improvements in Insect-Exterminators, of which the following is a specification.

My invention relates to devices for destroying insects and particularly relates to machines for destroying potato-bugs and has for its object the provision of a machine that is adapted to pass between two rows of growing plants and has two rolls, to crush the bugs, driven by gearing connecting with the carrying wheels, and two rotating blades geared to the axles of the rolls for knocking the insects from the plants so that they pass between the rolls.

The construction and operation of my improved insect destroyer will be described in detail hereinafter and illustrated in the accompanying drawings in which—

Figure 1:
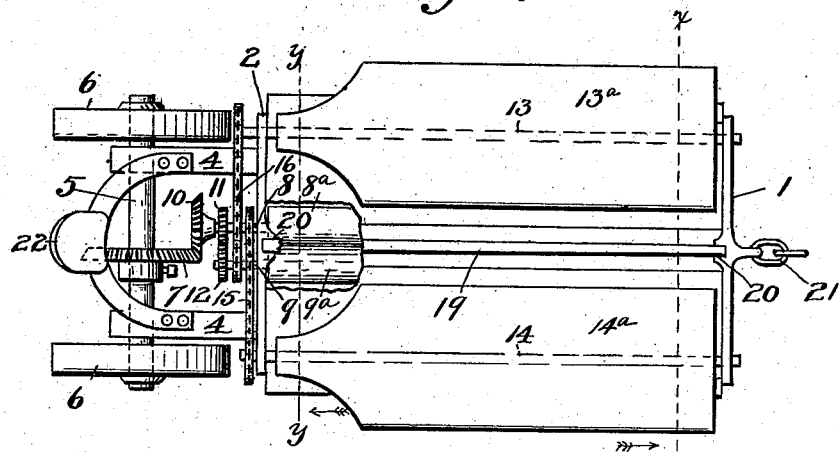
Figure 2:
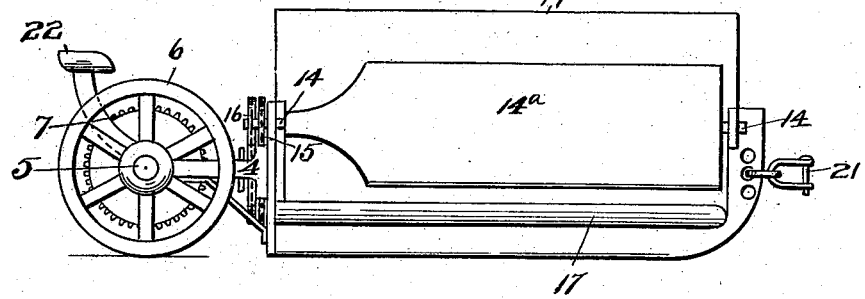
Figure 3:
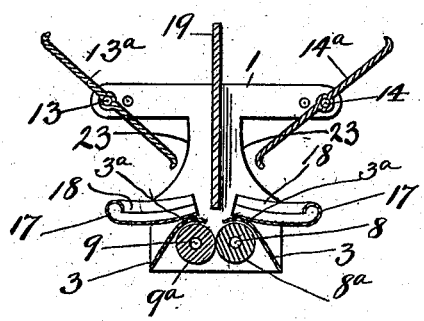
Figure 4:
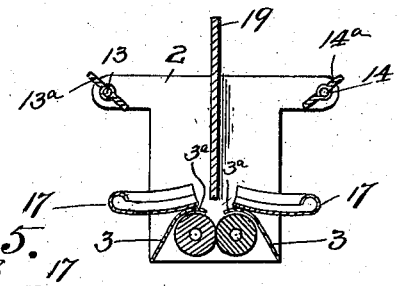
Figure 5:
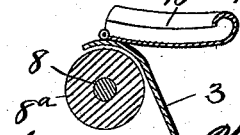

Figure 1 is a top plan view of my invention, Fig. 2, side view, Fig. 3, a cross section on the line x—x in Fig. 1 looking in the direction of the arrow, Fig. 4, a similar view on the line y—y in Fig. 1 looking in the direction of the arrow, and Fig. 5, an enlarged fragmental sectional view of one of the rollers, plates and pans.

In the drawings similar reference characters indicate corresponding parts throughout the several views.

The frame of my improved machine consists of two upright boards 1 and 2 at the front and rear of the machine respectively and having the plates 3 connecting them. 4 indicates arms extending rearwardly from the board 2 and having an axle 5 journaled on their rear ends with the traction wheels 6 and the beveled gear wheel 7 keyed thereto.

8 and 9 indicate shafts journaled in boards 1 and 2 and having rolls 8ª and 9ª, secured thereto, the surfaces of which engage one another as shown.

10 indicates a beveled gear wheel keyed to shaft 8 and meshing with gear wheel 7 and 11 and 12 pinions keyed to shafts 8 and 9 and meshing with each other.

The plates 3 have their upper ends curved over the rollers 8ª and 9ª as shown at 3ª and spaced apart over the contacting surfaces of the rolls so as to insure that the bugs that may be detached from the plants by the mechanism to be hereinafter described will fall between the rolls. The lower ends of the plates 3 extend downwardly to the lower edges of end boards 1 and 2 so as to inclose the rolls 8ª and 9ª at the sides and protect them from interference with the earth, etc., at each side of the row of plants.

13 and 14 indicate other shafts journaled in the upper ends of plates 1 and 2 having blades 13ª and 14ª secured thereto.

15 indicates a chain and sprocket gearing connecting shafts 8 and 14 and 16 another chain and sprocket gearing connecting shafts 9 and 13 so as to rotate the blades 13ª and 14ª.

17 indicates pans hinged to the curved portions 3ª of plates 3, said pans being made preferably of sheet metal and having their edges curled over as shown at 18 to prevent bugs that may alight in the pans from crawling out.

19 indicates a center board mounted in vertical grooves 20 in the boards 1 and 2 to stop the bugs that are knocked off from the plants by the blades 13ª and 14ª and compel them to fall between the rolls.

21 indicates a draft appliance on the front board 1, and 22 a seat for the operator secured to arms 4.

In operation my machine is driven between two rows of plants infested with insects so that the blades 13ª and 14ª engage the tops and the insects are knocked off by the rotation of the blades and striking the center board 19 fall between rolls 8ª and 9ª and are crushed. Should any insects alight on the pans 17 they will be prevented from crawling out by means of the curled over portion 18 of their edges.

To prevent the plants from being agitated by the front board 1 it has cut out portions 23 on each side while the rear ends of the blades 13ª and 14ª are cut away to prevent the plants from being broken between the ends of the blades and the edges of board 2.

Having thus described my invention what I claim is—

1. In an insect exterminator, a frame comprising front and rear boards, rolls journaled in said front and rear boards, plates connecting said front and rear boards having their upper portions extending over the tops of the rolls and their lower portions extending to the lower edges of said boards forming an inclosure for the rolls, blades journaled in said front and rear boards, arms extending rearwardly from the rear board, a drive shaft journaled in said arms, the traction wheels secured to said shaft, and gearing connecting said drive shaft and rolls and blades, substantially as shown and described.

2. An insect exterminator comprising a frame consisting of two boards, plates connecting said boards having their upper edges curved towards each other, pans pivotally secured to said curved portions of the plates and having their edges curled, shafts journaled in said boards beneath the curved portions of said plates, rolls mounted on said shafts, meshing pinions keyed to said shafts, a sprocket wheel keyed to each shaft, a beveled gear wheel secured to the end of one of said shafts, shafts journaled in the upper portion of said boards, blades secured to last mentioned shafts, a sprocket wheel keyed to each shaft, chains connecting the sprocket wheel on one of the first named shafts with the sprocket wheel on one of the last named shafts, arms secured to one of the boards, a drive shaft journaled in said arms, a beveled gear wheel secured to the drive shaft and meshing with the aforementioned beveled gear wheel, and traction wheels secured to said drive shaft, substantially as shown and described.

In testimony whereof I hereto affix my signature in the presence of two witnesses.

WILLIAM L. BOYD.

Witnesses:
M. H. CHRISTY,
GEO. W. MARTIN.